United States Patent [19]
Brace et al.

[11] Patent Number: 5,102,562
[45] Date of Patent: Apr. 7, 1992

[54] PROCESS FOR PREPARING A FABRIC SOFTENING LITHIUM EXCHANGED CLAY

[75] Inventors: Roger Brace, Chester; Andrew P. Chapple, Wrexham; Peter Graham, Wirral, all of United Kingdom

[73] Assignee: Lever Brothers Company, Division of Conopco, Inc., New York, N.Y.

[21] Appl. No.: 529,977

[22] Filed: May 29, 1990

[30] Foreign Application Priority Data

Jun. 2, 1989 [GB] United Kingdom ............... 8912772
Dec. 28, 1989 [GB] United Kingdom ............... 8929275

[51] Int. Cl.$^5$ .................... P06M 11/00; C01B 33/26; C01B 33/32
[52] U.S. Cl. ................... 252/8.6; 252/378 R; 252/174.25; 423/328; 423/332
[58] Field of Search ............ 423/326, 327, 328, 332; 252/8.8, 8.6, 378 R, 174.25; 502/80

[56] References Cited

U.S. PATENT DOCUMENTS

| | | | |
|---|---|---|---|
| 3,852,405 | 12/1974 | Granquist | 423/118 |
| 4,053,324 | 10/1977 | Haden | 126/468 |
| 4,062,647 | 12/1977 | Storm et al. | 252/8.8 |
| 4,687,521 | 8/1987 | Nadeau | 106/416 |
| 4,866,020 | 9/1989 | Atkins et al. | 502/80 |
| 4,915,854 | 4/1990 | Mao et al. | 252/8.8 |

FOREIGN PATENT DOCUMENTS

| | | |
|---|---|---|
| 297673 | 1/1989 | European Pat. Off. . |
| 1400898 | 7/1975 | United Kingdom . |
| 2179563 | 3/1987 | United Kingdom . |

Primary Examiner—Paul Lieberman
Assistant Examiner—Bradley A. Swope
Attorney, Agent, or Firm—A. Kate Huffman

[57] ABSTRACT

The invention relates to fabric softening clays, detergent compositions comprising clays and processes for producing the clays. The fabric softening clays are dioctahedral 2:1 layer phyllosilicates comprising at least 100 micrograms of lithium per gram of clay mineral. Problems of poor clay color may be overcome.

5 Claims, No Drawings

PROCESS FOR PREPARING A FABRIC SOFTENING LITHIUM EXCHANGED CLAY

FIELD OF THE INVENTION

The present invention relates to clays, detergent compositions comprising clays for washing fabrics and providing said fabrics with an improved softening benefit and to processes for producing the clays.

BACKGROUND OF THE INVENTION

With some fabrics, especially of natural origin repeated washing can lead to fabric harshness, giving the fabrics an unpleasant feel. For some years, fabric conditioning products have been available, intended inter alia for alleviating this fabric harshness by softening the fabrics in a post-washing step, for example in the rinse step of a fabric laundering process. There has been a desire to provide a single detergent composition which would be capable of both washing and softening the fabrics to overcome the inconvenience of using separate products.

According to British Patent GB 1 400 898 (Procter and Gamble/STORM) a possible solution to this problem is to include in the detergent composition a smectite clay containing material having a cation exchange capacity of at least 50 meq/100 g, together with a detergent active material.

While some success has been obtained with the use of such clay materials, softening performance still does not generally match that obtained by the use of separate products and there is therefore scope for improving performance.

Clays of interest in the present invention are swelling types, which expand and delaminate in liquid media. These clays belong to the group of phyllosilicates and are three-layer sheet type crystalline materials. The sheet structures are composed of three layer arrangements of tetrahedral silica, octahedral alumina, tetrahedral silica. The central layer may be dioctahedral or trioctahedral and the three layer sheet structures are separated by an interlamellar space.

The layer structure is subject to many variants in nature. For example the central octahedral layer may be occupied not by two aluminium ions ($Al^{3+}$) (dioctahedral) but by three magnesium ions ($Mg^{2+}$) (trioctahedral). In dioctahedral clays the octahedral layer may be partially occupied by the substitution of one $Al^{3+}$ for one $Mg^{2+}$ resulting in a residual surplus of negative charge in the structure. A residual surplus of negative charge can also arise when silicon ions ($Si^{4+}$) in the tetrahedral layer are replaced by aluminium ions ($Al^{3+}$).

The surplus of negative charge requires the presence of balancing cations which are located in the interlamellar space between the sheet structures. A measure of the degree of the surplus charge is given by the number of exchangeable cations, as reflected by the cation exchange capacity CEC of the pure mineral. The CEC of a mineral is directly related to the lattice charge deficiency of that mineral.

This can be further explained by a general representation of clays useful in the process of the present invention which fall into the half unit cell formula:

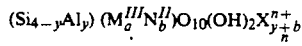     I where $X^{n+}$ is a balancing exchangeable cation for example $Na^+$, $Mg^{2+}$, ($Ca^{2+}$ or $K^+$ which can be univalent (n=1) or divalent (n=2)).

y+b is the lattice charge deficiency of the mineral per half unit cell $M^{III}$ is a trivalent metal ion e.g. $Al^{3+}$, $Fe^{3+}$, $Cr^{3+}$ $N^{II}$ is a divalent metal ion e.g. $Mg^{2+}$, $Fe^{2+}$, $Ni^{2+}$, $Zn^{2+}$ y is a positive number less than four, or zero a is a positive number less than or equal to two and b is a positive number less than two, or zero.

A unit cell is the smallest group of ions or atoms whose repetition at regular intervals, in three dimensions, produces the lattice of a given crystal.

CEC measurements indirectly determine the number of

present in 100 g and quote these as meq. The value of y+b (the lattice charge deficiency) in gramme equivalents per half unit cell is therefore directly related to CEC.

The smectite clays taught in GB 1 400 898 are 2:1 layer phyllosilicates which we believe are characterised by possessing a lattice charge deficiency in the range of 0.2 to 0.6 g equivalents per half unit cell.

European Patent Application 0 297 673 (Procter and Gamble/BAECK) discloses that the softening performance of detergent compositions can be improved by increasing deposition of clay onto the fabric during the washing process. Increased deposition is said to be achieved by the inclusion of from 1 to 25% by weight of a natural hectorite clay in the form of particles in the composition where at least 50% of the clay we believe has a value of y+b from 0.23 to 0.31.

The number and availability of such naturally occurring clays is fairly limited. Such naturally occurring clays may also be of unsuitable colour for inclusion in a detergent composition or may give rise to fabric colour dulling once deposited thereon.

SUMMARY OF THE INVENTION

We have now discovered that it is possible to modify the lattice charge deficiency of certain clays so that their softening performance is improved. A preferred feature of these modified materials is that they contain clay minerals in which the lattice charge deficiency is at the lower end of the 0.2 to 0.6 g equivalents per half unit cell range.

We have also found that certain useful modified clays can for example be characterised by the quantity of lithium in the clay mineral.

Thus according to the invention there is provided a fabric softening clay mineral which is a dioctahedral 2:1 layer phyllosilicate comprising at least 100 micro grams of lithium per gram of clay mineral.

DETAILED DESCRIPTION OF PREFERRED EMBODIMENT

In general, the lithium containing clays according to the present invention fall into the formula:

$$(Si_{4-y}Al_y)(M^{III}_a N^{II}_b Li_c)O_{10}(OH)_2 X^{n-}_{\frac{y+b-c}{n}} \quad \text{II}$$

where $X^{n-}$, $M^{III}$, $N^{II}$, y and b have the same values as given in formula I, $y+b-c$ is the lattice charge deficiency of the mineral per half unit cell and c is a positive number less than 2.

The non-exchangeable lithium content of a clay mineral can be determined by a process of cation exchange followed by spectrometer analysis.

The clay is first washed with sodium chloride solution and then suspended in water at a concentration of 1 g/l. The suspension is left to stand overnight and then decanted to that any cominerals present in the clay material are discarded as precipitate. The clay mineral is then dried.

10 g of the clay mineral is then dispersed in 100 ml of 0.5 molar $CaCl_2$ solution and stirred for 1 hour. The mixture is then centrifuged and the process repeated with fresh $CaCl_2$ solution. The purpose of this step is to remove any exchangeable lithium still present in the clay.

The clay is then washed extensively to remove excess electrolyte and dried at 100° C. 0.25 g of this clay is dissolved in 10 ml of water and 40 ml of 4% nitric acid. All are accurately weighed. The final solution is analysed by atomic adsorption using a spectrometer e.g. VARIAN AA975. The results are quoted on dry weights of clay calculated by measuring % weight loss on calcination at 1000° C. for 1 hour.

From analysis of prior art clays we have found that the levels of lithium in naturally occurring clays are very low. For example PRASSA clay ex CSM has a natural lithium content of 28 micro grams per gram of clay mineral. The lithium content of PRASSA clay modified according to the process of the present invention is around 830 micrograms per gram of clay mineral. This corresponds to a value of c of 0.04 and a change in lattice charge deficiency from 0.47 g equivalents per half unit cell to 0.43 g equivalents per half unit cell.

Preferably clays according to the invention comprise at least 800 micrograms of lithium per gram of clay, preferably 100 to 10,000 micrograms of lithium per gram of clay.

According to another aspect of the invention there is provided a detergent composition for washing and softening fabrics comprising at least one detergent active material and, as a fabric softening agent a clay mineral which is a dioctahedral 2:1 layer phyllosilicate comprising at least 100 micrograms of lithium per gram of clay mineral.

According to another aspect of the invention there is provided a modified clay mineral which is a 2:layer phyllosilicate in which the interlamellar charge has been reduced so that the lattice charge deficiency of the clay lies in the range of 0.2 to 0.4 g of equivalents per half unit cell.

According to a further aspect of the invention there is provided a detergent composition for washing and softening fabrics comprising at least one detergent active material and, as a fabric softening agent a modified clay mineral which is a 2:1 layer phyllosilicate in which the interlamellar charge has been reduced to give a clay possessing a lattice charge deficiency in the range of 0.2 to 0.4 g equivalents per half unit cell.

Such modified clays in certain embodiments have the advantage that they can be selected from a wide range of good colour parent clays and problems of mineral colour experienced with some natural clays overcome.

Detergent compositions containing such modified clays have the advantage that colour dulling associated with off colour clays may be avoided and improved softening can be obtained.

The modification of smectite clays for use as catalysts is disclosed in British Patent Application 2 179 563A (British Petroleum Company plc/BALLANTINE) and comprises the steps of cation-exchanging a cation-exchangeable layered clay with a solution comprising catalytically active cations and cations capable of migrating into vacant sites in the octahedral layer (typically lithium) and heating the exchanged clay at a temperature in the range from 200° to 500° C.

The effect of incorporating a cation capable of migrating into vacant sites in the octahedral layer of the clay is to reduce the lattice charge deficiency of the clay and consequently the cation exchange capacity. In GB 2 179 563A the cation exchange capacity of smectite clays is reduced to a range of from about 25 to about 45 meq/100 g. The clays are then rendered substantially non-swelling and non-fabric softening.

This process suffers from the disadvantages that relatively long equilibration times are necessary to allow the initial cation exchange to take place, typically six hours and heating clays at temperatures above 200° C. can lead to discolouration.

We have now discovered that it is possible to modify the lattice charge deficiency of clays for example by a process of cation migration giving a reduced tendency for clay discolouration. According to another aspect of the present invention there is provided a process for preparing a modified clay mineral which is a 2:1 layer phyllosilicate comprising the steps of heating a migrating cation exchanged clay at temperatures less than 200° C. to reduce the interlamellar charge.

This process has the advantage that heating clays at temperatures below 200° C. gives a lesser degree of clay discolouration.

The migrating cation is typically lithium, the process being carried out on a partially lithium exchanged clay or on a fully lithium exchanged clay.

One aspect of the process of the present invention comprises the preparation of partially cation exchanged clays. They may be prepared by mixing dry sodium clay with a solution containing lithium ions, typically LiCl solution to form a stiff dough. The dough is then subjected to high shear in a sigma blade mixer and then dried and crushed.

They may also be prepared by spraying sodium clay with a lithium solution in a rotating drum, for example an agglomerating apparatus.

Alternatively the clays may be prepared by:
(i) mixing dilute aqueous suspensions of fully lithium and fully sodium exchanged clays in appropriate ratios; or
(ii) carrying out ion exchange of the clay in a mixed sodium/lithium medium.

Preferably, the mixtures of sodium and lithium clay minerals are in the ratio range of 8:2 to 2:8 parts by weight of sodium clay to lithium clay.

These partially lithium exchanged clays once prepared are preferably heated at temperatures of less than 200° C. for at least ¼ hour to effect migration of the lithium and lattice charge reduction.

We have found that clays with improved softening benefit may be obtained by controlled heating of a fully migrating cation exchanged clay to effect partial cation migration. The migrating cation is typically lithium. Preferably the clay is heated at a temperature of less than 200° C. for less than one hour. More preferably the clay is heated at a temperature of less than 180° C. for half an hour.

This process has the advantage that the long equilibration step necessary with some preparation of mixed Na:Li clays is obviated.

Clay mineral containing materials useful in the present invention include dioctahedral three layer smectite clays, ideally of the calcium and/or sodium montmorillonite type. For example PRASSA clay from Greece, GELWHITE from Texas U.S.A., WILLEMSE from South Africa and VOLCLAY BC from Wyoming. The effectiveness of a clay containing material as a fabric softener will depend partly on the level of clay mineral in the material.

Preferably once modified the clay minerals have a cation exchange capacity of between 55 and 95 meq/100 g, more preferably 55 to 70 meq/100 g.

Preferably once modified the clay minerals have a lattice charge deficiency less than 0.6 g equivalents per half unit cell, more preferably between 0.2 and 0.4 g equivalents per half unit cell.

The reasons for the improved softening benefits obtained with the modified clays is not fully understood. While not wishing to be bound by theory one may suppose that differences in lattice charge affect the strength of repulsive forces between the clay and the fabric enabling a higher level of deposition to be maintained on the fabric surface even over multiple washes.

The detergent compositions according to the present invention may take various physical forms and may contain a variety of additional ingredients.

An essential ingredient is a detergent active material. This may be selected from anionic, nonionic, amphoteric, zwitterionic and cationic materials, with a special preference for synthetic anionic surfactants with or without nonionic surfactants.

Particularly preferred are mixtures of anionic and nonionic detergent active materials such as a mixture of an alkalimetal salt of an alkyl benzene sulphonate together with an alkoxylated alcohol. Even more preferred are anionic detergent active materials used without nonionic materials. The level of detergent active material or materials in the composition may be from 2% to 50%, most preferably from 5% to 30% by weight.

The preferred detergent compounds which can be used are synthetic anionic and nonionic compounds. The former are usually water-soluble alkali metal salts of organic sulphates and sulphonates having alkyl radicals containing from about 8 to about 22 carbon atoms, the term alkyl being used to include the alkyl portion of higher acyl radicals. Examples of suitable synthetic anionic detergent compounds are sodium and potassium alkyl sulphates, especially those obtained by sulphating higher ($C_8$–$C_{18}$) alcohols produced for example from tallow or coconut oil, sodium and potassium alkyl ($C_9$–$C_{20}$) benzene sulphonates, particularly sodium linear secondary alkyl ($C_{10}$–$C_{15}$) benzene sulphonates; sodium alkyl glyceryl ether sulphates, especially those ethers of the higher alcohols derived from tallow or coconut oil and synthetic alcohols derived from petroleum; sodium coconut oil fatty monoglyceride sulphates and sulphonates; sodium and potassium salts of sulphuric acid esters of higher ($C_8$–$C_{18}$) fatty alcohol-alkylene oxides, particularly ethylene oxide, reaction products; the reaction products of fatty acids such as coconut fatty acids esterified with isethionic acid and neutralised with sodium hydroxide; sodium and potassium salts of fatty acid amides of methyl taurine; alkane monosulphoantes such as those derived by reacting alpha-olefins ($C_8$–$C_{20}$) with sodium bisulphite and those derived from reacting paraffins with $SO_2$ and $Cl_2$ and then hydrolysing with a base to produce a random sulphonate; and olefin sulphonates, which term is used to describe the material made by reacting olefins, particularly $C_{10}$–$C_{20}$ alpha-olefins, with $SO_3$ and then neutralising and hydrolysing the reaction product. The preferred anionic detergent compounds are sodium ($C_{11}$–$C_{15}$) alkyl benzene sulphonates and sodium ($C_{16}$–$C_{18}$) alkyl sulphates.

Suitable nonionic detergent compounds which may be used include in particular the reaction products of compounds having a hydrophobic group and a reactive hydrogen atom, for example aliphatic alcohols, acids, amide or alkyl phenols with alkylene oxides, especially ethylene oxide either alone or with propylene oxide. Specific nonionic detergent compounds are alkyl ($C_6$–$C_{22}$) phenols-ethylene oxide condensates, generally up to 25 EO, i.e. up to 25 units of ethylene oxide per molecule, the condensation products of aliphatic primary or secondary linear or branched alcohols with ethylene oxide, generally up to 40 EO, and products made by condensation of ethylene oxide with the reaction products of propylene oxide and ethylenediamine. Other so-called nonionic detergent compounds include long chain tertiary amine oxides, long chain tertiary phosphine oxides and dialkyl sulphoxides.

Mixtures of detergent compounds, for example mixed anionic or mixed anionic and nonionic compounds may be used in the detergent compositions, particularly in the latter case to provide controlled low sudsing properties. This is beneficial for compositions intended for use in suds-intolerant automatic washing machines.

Amounts of amphoteric or zwitterionic detergent compounds can also be used in the compositions of the invention but this is not normally desired due to their relatively high cost. If any amphoteric or zwitterionic detergent compounds are used it is generally in small amounts in compositions based on the much more commonly used synthetic anionic and/or nonionic detergent compounds.

A detergency builder may also be present. This may be any material capable of reducing the level of free calcium ions in the wash liquor and will preferably provide the composition with other beneficial properties such as the generation of an alkaline pH, the suspension of soil removed from the fabric and the suspension of the fabric softening clay material. The level of the detergency builder may be from 10% to 70% by weight, most preferably from 25% to 50% by weight.

Examples of detergency builders include precipitating builders such as the alkali metal carbonates (with or without seed crystals such as calcite), bicarbonates, ortho phosphates, sequestering builders such as the alkali metal tripolyphosphates or nitrilotriacetates, or ion-exchange builders such as the amorphous alkalimetal aluminosilicates or the zeolites.

The clay material can be added in various physical forms. It may, for example, be spray-dried with other components of the formulation or it may be added separately. In the latter case the clay may be ground to a suitable size, say 5 to 2000 microns, or may be in the form of granulated fine particles optionally containing a binder such as an inorganic salt or a surfactant. Especially suitable binders are sodium silicate and nonionic detergent active materials.

The level of the fabric softening clay material in the composition should be sufficient to provide a softening benefit, such as from 1.5% to 35% by weight, most preferably from 4% to 15% by weight, calculated on the basis of the clay mineral per se.

In addition to the detergent active material, the detergency builder and the clay containing material, the compositions according to the invention optionally contain other ingredients.

Apart from the components already mentioned, a detergent composition of the invention can contain any of the conventional additives in the amounts in which such additives are normally employed in fabric washing detergent compositions. Examples of these additives include additional fabric softening agents such as a cationic fabric softening agent or a fatty amine. Further examples of these additives include the lather boosters such as alkanolamides, particularly the monoethanolamides derived from palm kernel fatty acids and coconut fatty acids, lather depressants, oxygen-releasing bleaching agents such as sodium perborate and sodium percarbonate, peracid bleach precursors, chlorine-releasing bleaching agents such as triclorisyocyanuric acid, inorganic salts such as sodium sulphate, other fillers such as kaolin, and, usually present in very minor amounts, fluorescent agents, perfumes, other enzymes such as proteases lipases and amylases, germicides and colourants.

The invention will now be described in more detail with reference to the following non-limiting examples.

EXAMPLES

| Example No. | Na:Li Clay | CEC (meq/ 100 g) +7 | Colour E +2 230° C. heating 16 hours |
|---|---|---|---|
| 1 | 10:0 | 86 | 8.7 (un-heated) |
| 2 | 8:2 | 76 | 16 |
| 3 | 6:4 | 63 | 17 |
| 4 | 4:6 | 44 | 17 |
| 5 | 2:8 | 31 | 17.3 |

| Example No. | Na:Li Clay | Heating time (hr) at 230° C. | CEC (meq 100 g) +7 | Colour E +2 230° C. heating |
|---|---|---|---|---|
| 6 | 0:10 | 0 | 86 | 8.7 (unheated) |
| 7 | 0:10 | 0.5 | 40 | 13.6 |
| 8 | 0:10 | 1 | 23 | 15.4 |
| 9 | 0:10 | 2 | 20 | 16.7 |
| 10 | 0:10 | 4 | 19 | 16.8 |
| 11 | 0:10 | 8 | 18 | 17.9 |
| 12 | 0:10 | 24 | 18 | 17.4 |

| Example No. | Na:Li Clay | Heating time (hr) at 180° C. | CEC (meq 100 g) +7 | Colour E +2 230° C. heating |
|---|---|---|---|---|
| 13 | 0:10 | 0 | 86 | 8.7 (unheated) |
| 14 | 0:10 | 0.5 | 67 | 7.1 |
| 15 | 0:10 | 1 | 51 | 7.6 |
| 16 | 0:10 | 2 | 42 | 8.7 |
| 17 | 0:10 | 4 | 37 | 9.3 |
| 18 | 0:10 | 8 | 36 | 10.4 |
| 19 | 0:10 | 24 | 31 | 11.5 |

-continued

| Example No. | Na:Li Clay | Heating time (hr) at 150° C. | CEC (meq 100 g) +7 | Colour E +2 230° C. heating |
|---|---|---|---|---|
| 20 | 0:10 | 0.5 | 84.1 | 8.5 |
| 21 | 0:10 | 1 | 75.8 | 8.0 |
| 22 | 0:10 | 2 | 71.9 | 8.4 |
| 23 | 0:10 | 4 | 57.4 | 8.5 |

The sodium clay was PRASSA clay ex Colin Stewart Minerals. The lithium clay was prepared by treatment of the sodium clay with a lithium chloride solution. The mixed Na/Li clays were prepared by fully dispersing in water samples of the clays to form 2% stock solutions and then mixing appropriate volumes of the stock solutions with intermittent agitation over a period of 9 days.

Cation exchange capacities were measured by the "ammonium-in" method based on that described in "Grimshaw, The Chemistry and Physics of Clays p264-265 (Interscience)". Each clay sample was exchanged with $NH_4^+$. 1 g of the dried material was then boiled for 30 minutes in 50 ml of 1N NaOH (ag). The gaseous ammonia evolved was passed through a water-cooled condenser into 25 ml (v) or 0.1N HCl (aq) ($N_1$). This was then titrated with 0.1N NaOH (aq) ($N_2$) to a liter volume, T, using phenolphthalein indicator. The CEC is then given by:

$$CEC = 10^2(VN_1 - TN_2)(meq/100\ g).$$

The CEC measurements were adjusted to a moisture content of 12%. Colour changes were measured against a magnesium oxide standard using a Micromatch 2000 according to the method described in "C Brent Smith, Textile Chemist and Colourist, Nov. 1985, vol 17, 11 p208" and references therein. The higher the value of E the more the departure from the white standard.

A detergent composition was prepared using the following formulation.

| Ingredient | Parts by weight |
|---|---|
| Anionic detergent active[1] | 24.2 |
| Nonionic active[2] | 2.7 |
| Sodium tripolyphosphate | 58.1 |
| Sodium alkaline silicate | 15.0 |

[1]Linear alkyl benzene sulphonate
[2]Synperonic A7 (ex ICI) which is a $C_{13}$-$C_{15}$ alcohol ethoxylated with approximately 7 moles of ethylene oxide per molecule.

Terry cotton samples were subjected to one wash cycle under the following conditions using a formulation dosage of 1.86 g/liter and a clay dosage of 0.5 g/liter selected from Examples 1-19 above.

| Wash temperature | 40° C. |
|---|---|
| Wash time | 15 min |
| Liquor:cloth | 20:1 |
| Rinse | 2 × 2 min |
| Water | 24°FH (London) |

Softness evaluation was carried out by a process of paired comparison using a panel of trained assessors who together assign a softening score for each tested formulation. The relative softening performance for some of the clays of Examples 1-19 expressed as a percentage of the maximum preference score against their cation exchange capacities is given in the tables below.

TABLE 1

| Example No. | CEC | % softening (relative) |
| --- | --- | --- |
| 1 | 86 | 81.5 |
| 2 | 76 | 99.8 |
| 3 | 63 | 100 |
| 5 | 31 | 10.8 |
| No clay | — | 0 |

Table 1 shows the enchanced softening performance of modified clays according to the invention produced from mixed sodium/lithium clays.

TABLE 2

| Example No. | CEC | % softening |
| --- | --- | --- |
| 6 | 86 | 100 |
| 7 | 40 | 21 |
| 8 | 23 | 0 |

Table 2 shows that no enhanced softening performance was obtained for fully lithium exchanged clays heated at 230° C. for times in excess of half an hour. The colour change data for this temperature also shows a marked departure from the unmodified clay although even clay modified at this temperature is of better colour than naturally occurring low lattice charge deficiency clays with typical E's in the range of 20–31.

TABLE 3

| Example No. | CEC | % softening |
| --- | --- | --- |
| 13 | 86 | 80.1 |
| 14 | 67 | 100 |
| 15 | 51 | 20.8 |
| 16 | 42 | 18.1 |
| 17 | 37 | 0 |

Table 3 shows the enhanced softening performance of modified clays according to the invention. Comparison of the E values for clays heated at 230° C. (Examples 6–12) shows that less deterioration in colour is seen at the lower temperature.

EXAMPLES A to F

In Examples A to F mixed sodium/lithium clays were prepared by fully dispersing in water samples of a sodium clay and a lithium clay to form 2% stock solutions. Appropriate volumes of the stock solutions were left to equilibrate with intermittent agitation over a period of 9 days. The clays were then filtered and dried at 50° C. in vaccuum oven. The clays were then heated for various times at 180° C. to effect lithium migration.

Cation exchange capacities were measured by the "ammonium-in" method based on that described in "Grimshaw, The Chemistry and Physics of Clays p264–265 (Interscience)".

Colour changes were measured against a magnesium oxide standard using a Micromatch 2000 according to the method described in "C Brent Smith, Textile Chemist and Colourist, Nov.1985, Vol. 17, ii p208" and references therein. The higher the value of delta E the more the departure from the white standard.

| Example | Na:Li Clay | Heating time (hr) at 180° C. | CEC meq/100 g ±7 | Colour E ±2 |
| --- | --- | --- | --- | --- |
| A | 10:0 | 4 | 86 | 9.0 |
| B | 6:4 | 4 | 63 | 19.6 |
| C | 4:6 | 4 | 44 | 13.4 |
| D | 10:0 | 2 | 86 | 9.0 |
| E | 8:2 | 2 | 73 | 12.5 |
| F | 6:4 | 2 | 64 | 15.8 |

A detergent composition was prepared using the following formulation:

| Ingredient | Parts by weight |
| --- | --- |
| Anionic detergent active | 9 |
| Synperonic A7 | 1 |
| STP | 21.5 |
| Silicate | 5.5 |
| DKW | 2.7 |
| $Na_2SO_4$ | 24 |
| Perborate tetrahydrate | 23 |
| $H_2O$ | 10.3 |

DKN denotes a polyelectrolyte.

Terry cotton samples were subjected to one wash cycle under the following conditions using a formulation dosage of 5 g/l and a clay dosage of 0.5 g/l selected from samples A to F above.

| Wash temperature | 40° C. |
| --- | --- |
| Wash time | 15 min |
| Liquor:Cloth | 20:1 |
| Rinse | 2 × 2 min |
| Water | 24°FH London |

Softness evaluation was carried out by a process of paired comparison using a panel of trained assessors who together assign a softening score for each tested formulation. A softening score of 0 was allocated to a terry sample washed with the formulation but containing no clay and the remaining scores adjusted accordingly. A difference of 0.33 softness is significant with a 95% confidence limit.

| Clay from Example | Pair Score |
| --- | --- |
| A | 0.63 |
| B | 1.48 |
| C | 1.43 |
| D | 0.87 |
| E | 1.42 |
| F | 1.43 |

Comparison of results B and C with the control A shows the enhanced softening obtained from modified clays according to the invention. Similarly, comparison of results E and F with the control D shows the enhanced softening obtained from modified clays according to the invention.

EXAMPLES G TO I

A detergent composition was prepared using the following formulation:

| Ingredient | Parts by Weight |
| --- | --- |
| LAS | 9 |
| Synperonic A7 | 1 |
| Zeolite | 25 |
| (Sokalan) CP5 | 4 |
| Sulphate | 27.2 |

| Ingredient | Parts by Weight |
| --- | --- |
| Perborate | 23 |
| Water | 10 |

LAS denotes linear alkyl benzene sulphonate Synperonic A7 (ex ICI) is a $C_{13}$–$C_{15}$ alcohol ethoxylated with approximately 7 moles of ethylene oxide per molecule. Sokalan CP5 is an acrylic polymer ex BASF.

Terry cotton samples were subjected to one wash cycle under the following conditions using a formulation dosage of 5 g/l and, where appropriate, a clay dosage of 0.5 g/l.

| Wash temperature | 40° C. |
| --- | --- |
| Wash time | 15 minutes |
| Liquor:Cloth | 20:1 |
| Rinse | 2 × 2 min |
| Water | 25°FH |

| Example | Clay | Softening Score 1 wash |
| --- | --- | --- |
| G | Nil | 0 |
| H | Sodium[1] | 0.85 |
| I | modified[2] | 1.83 |

[1] The sodium clay used was Prassa ex Colin Stewart Minerals.
[2] The modified clay used was a sodium/lithium clay prepared in the same manner as in Examples A to F with a Na:Li ratio of 8:2, heated at 150° C. for four hours.

The softening scores were evaluated in the same manner as in Examples A to F. A difference of 0.48 softness is significant with a 95% confidence limit.

EXAMPLES J TO R

In the following examples mixed sodium/lithium clays were prepared by mixing 50 parts by weight of a solution of lithium chloride with 100 parts by weight of sodium clay (PRASSA ex CSM). The concentration of lithium chloride was adjusted to give either 1% by wt. lithium chloride based on the weight of the clay or 4% by weight. The mix was then worked in a Sigma blade mixer at 60° C. for about 1 hour. The resulting dough was dried before being crushed to a coarse powder. The resulting sodium/lithium clay was then heated to effect lithium exchange as detailed below.

| Clay | Type |
| --- | --- |
| J | sodium clay (Prassa ex CSM) |
| K | 1% LiCl exchanged clay, processed as described above, dried at 160° C. for 1 hour, heated at 190° C. for 3 hours. |
| L | 4% LiCl exchanged clay, processed as described above, dried at 50° C. for 16 hours, heated at 175° C. for 35 mins. |
| M | 8:2, Na:Li clay prepared in the manner as described in Examples A to F and heated at 150° C. for 4 hours. |

A detergent composition was prepared using the formulation of Examples G to I.

Terry cotton samples were then washed in tergotometers according to the conditions given below using a formulation dosage of 2.5 g/liter and where appropriate a clay dosage of 0.5 g/liter selected from clays J to M above.

| Wash temperature: | 40° C. |
| --- | --- |
| Wash time: | 15 minutes |
| Liquor:Cloth | 20:1 |
| Rinse: | 2 × 2 minute |
| Water: | 26°FH. |

Softness evaluation was carried out by a process of paired comparison in the manner described for the previous examples. The results are as follows with softening scores being quoted with a 95% confidence limit of 0.48.

| Example | Clay | Softening Score |
| --- | --- | --- |
| N | — | 0 |
| O | J | 0.73 |
| P | K | 1.68 |
| Q | L | 1.66 |
| R | M | 1.77 |

These examples show that high shear mixing of clay and lithium chloride solutions gives a substantially equal improvement in softening to clays prepared by the lengthier exchange process of the samples of examples A to F. (Compare Examples P and Q with R).

EXAMPLES S TO Z

In the following examples mixed sodium/lithium clays were prepared by mixing 50 parts by weight of a lithium chloride solution with 100 parts by weight of sodium clay in a Sigma blade mixer for varying times. The ratio on a weight basis of lithium to clay was 2:100. The clays were prepared as follows.

| Clay | Type |
| --- | --- |
| S | 2% LicL exchanged clay, mixed for 10 minutes, dried and heated at 150° C. for 2 hours. |
| T | 2% LicL exchanged clay, mixed for 30 minutes, dried and heated at 150° C. for 2 hours. |
| U | 2% LiCl exchanged clay, mixed for 90 minutes dried and heated at 150° C. for 2 hours. |

Softness evaluations were carried out as described in Examples J to R. A difference of 0.27 softness is significant with a 95% confidence limit.

| Example | Clay from Example | Softening Score |
| --- | --- | --- |
| V | — | 0 |
| W | J | 0.87 |
| X | S | 1.54 |
| Y | T | 1.49 |
| Z | U | 1.80 |

We claim:
1. A process for preparing a fabric softening clay mineral comprising:
   (a) selecting a dioctahedral 2:1 layer phyllosilicate which is substantially a swelling type of clay mineral and which is modifiable by lithium exchange; and
   (b) heating the phyllosilicate to a temperature of from 150° C. to below 200° C. to form a fabric softening clay mineral having a reduced cation exchange capacity (CEC) of 55–70 MEQ/100 grams and having at least 100 micrograms of lithium per gram of the phyllosilicate.

2. The process according to claim 1 wherein the selecting step comprises:

selecting the phyllosilicate as a fully migrating cation exchanged clay mineral.

3. The process according to claim 2 wherein the heating step comprises:

heating the phyllosilicate for less than one hour.

4. The process according to claim 1 wherein the heating step further comprises:

heating the phyllosilicate in a sodium/lithium medium having a mixture of sodium and lithium clay minerals in a ratio ranging from 8:2 to 2:8 parts by weight of a sodium clay to a lithium clay.

5. A process for preparing a fabric softening clay mineral comprising:

(a) selecting a dioctahedral 2:1 layer phyllosilicate which is substantially a swelling type of clay mineral and which is fully lithium exchanged; and (b) heating the phyllosilicate at a temperature of from 150° C. to below 200° C. for less than one hour to form a fabric softening clay mineral having a reduced cation exchange capacity (CEC) of 55 to 70 MEQ per 100 grams of the phyllosilicate.

* * * * *